(12) United States Patent
Sieradzki

(10) Patent No.: US 11,235,528 B2
(45) Date of Patent: Feb. 1, 2022

(54) CARRIAGELESS PRINT HEAD ASSEMBLY FOR EXTRUSION-BASED ADDITIVE CONSTRUCTION

(71) Applicant: Paul Sieradzki, New York, NY (US)

(72) Inventor: Paul Sieradzki, New York, NY (US)

(73) Assignee: R3 Printing, Inc., Wilmington, DE (US)

( * ) Notice: Subject to any disclaimer, the term of this patent is extended or adjusted under 35 U.S.C. 154(b) by 607 days.

(21) Appl. No.: 15/694,772

(22) Filed: Sep. 2, 2017

(65) Prior Publication Data

US 2019/0070780 A1  Mar. 7, 2019

(51) Int. Cl.

| | | |
|---|---|---|
| *B29C 64/364* | (2017.01) | |
| *B29C 64/209* | (2017.01) | |
| *B33Y 30/00* | (2015.01) | |
| *B33Y 50/02* | (2015.01) | |
| *B29C 64/386* | (2017.01) | |
| *B29C 64/106* | (2017.01) | |
| *B29C 64/393* | (2017.01) | |
| B29C 48/87 | (2019.01) | |

(52) U.S. Cl.
CPC .......... *B29C 64/364* (2017.08); *B29C 64/106* (2017.08); *B29C 64/209* (2017.08); *B29C 64/386* (2017.08); *B29C 64/393* (2017.08); *B33Y 30/00* (2014.12); *B33Y 50/02* (2014.12); B29C 48/87 (2019.02)

(58) Field of Classification Search
CPC .... B29C 64/118; B29C 64/209; B29C 64/295
See application file for complete search history.

(56) References Cited

U.S. PATENT DOCUMENTS

| | | |
|---|---|---|
| 7,604,470 B2 | 10/2009 | Labossiere et al. |
| 7,992,419 B2 | 8/2011 | Sillekens et al. |
| 9,050,753 B2 | 6/2015 | Rodgers et al. |
| (Continued) | | |

FOREIGN PATENT DOCUMENTS

| | | |
|---|---|---|
| CN | 201329320 Y | 10/2009 |
| CN | 101274390 B | 12/2010 |
| (Continued) | | |

OTHER PUBLICATIONS

Translation of Jin CN 10623992.*

(Continued)

*Primary Examiner* — Galen H Hauth
*Assistant Examiner* — Asha A Thomas
(74) *Attorney, Agent, or Firm* — MG Miller Intellectual Property Law LLC

(57) ABSTRACT

A carriageless print head assembly, for use in extrusion-based additive construction is disclosed. The carriageless print head features a cold end equipped with one or more timing belt attachment slots and bores for receiving bearings to achieve linear motion. The carriageless print head may be optionally equipped with some combination of an air conduit for cooling the top layer of the constructed product, a fluid channel for aiding in the regulation of the temperature of the print head cold end, and a thermal monitor for monitoring the temperature of the cold end of the print head. A computer-mediated method of monitoring the cold end of the print head to limit jams due to overheating is also disclosed.

4 Claims, 11 Drawing Sheets

(56) References Cited

U.S. PATENT DOCUMENTS

| | | | |
|---|---|---|---|
| 2011/0077480 A1* | 3/2011 | Bloom | A61B 5/14532 600/310 |
| 2013/0078073 A1* | 3/2013 | Comb | F16H 19/06 414/749.1 |
| 2015/0307385 A1 | 10/2015 | Klein et al. | |
| 2015/0323107 A1 | 11/2015 | Ott et al. | |
| 2016/0069622 A1 | 3/2016 | Alexia et al. | |
| 2016/0236408 A1* | 8/2016 | Wolf | B33Y 30/00 |
| 2016/0236409 A1 | 8/2016 | Armani et al. | |
| 2016/0297110 A1 | 10/2016 | Wu | |
| 2016/0358842 A1 | 12/2016 | Milne | |
| 2017/0051787 A1 | 2/2017 | Reveles et al. | |
| 2017/0066194 A1 | 3/2017 | Bromer | |

FOREIGN PATENT DOCUMENTS

| | | | |
|---|---|---|---|
| CN | 103753816 A | | 4/2014 |
| CN | 203509037 U | | 4/2014 |
| CN | 104768356 A | | 7/2015 |
| CN | 204451219 U | | 7/2015 |
| CN | 204526176 U | | 8/2015 |
| CN | 204566699 U | | 8/2015 |
| CN | 204622620 U | | 9/2015 |
| CN | 204653641 U | | 9/2015 |
| CN | 204712395 U | | 10/2015 |
| CN | 204801058 U | | 11/2015 |
| CN | 105252773 A | | 1/2016 |
| CN | 205130413 U | | 4/2016 |
| CN | 104338933 B | | 5/2016 |
| CN | 105538724 A | | 5/2016 |
| CN | 205326301 U | | 6/2016 |
| CN | 205732976 U | | 11/2016 |
| CN | 106239922 A | | 12/2016 |
| CN | 106239922 A | * | 12/2016 |
| WO | 2016036435 A1 | | 3/2016 |
| WO | 2016082036 A1 | | 6/2016 |
| WO | 2016207712 A1 | | 12/2016 |
| WO | 2017044833 A1 | | 3/2017 |

OTHER PUBLICATIONS

Klaus Daume, "Water Cooling Block". https://pinshape.com/items/13456-3d-printed-water-cooling-block, (Accessed an May 1, 2018), Pinshape.

Icefire, "Cooling With An Air Pump?", http://forums.reprap.org/read.php?1,735688, (Accessed on May 1, 2018), RepRap.

Scott J. Grunewald, "OPAM (One-Piece All-Metal) Water-Cooled Hot End Launches on Indiegogo", https://3dprint.com/63040/opam-water-cooled-hot-end/, (Published on May 5, 2015), 3DR Holdings.

Ho Leong Khit, "OPAM water-cooled Hot End, OPAM (One Piece All Metal) water-cooled Hot End", https://www.indiegogo.com/projects/opam-water-cooled-hot-end#/, (Accessed on May 1, 2018), Indiegogo.

E3D-Online, "The Kraken", https://e3d-online.com/The-Kraken, (Accessed on May 3, 2018), E3D-Online.

Adrian-Bowyer, "Water-cooled Hot End", http://www.thingiverse.com/thing:26862, (Published on Jul. 15, 2012), Thingiverse.

Kerry Stevenson, "Wim3rl: A Water-Cooled 3D Printhead", http://www.fabbaloo.com/blog/2016/1/2/wim3rl-a-water-cooled-3d-printhead, (Published on Jan. 11, 2016), Fabbaloo.

RepRap, "Water Cooled Hotend", http://reprap.org/wiki/Water_Cooled_Hotend, (Last modified on Oct. 6, 2013), RepRap Wiki.

Michael Molitch-Hou, "Delta 3D Printers Get Three Heads Thanks To A Little H20", https://3dprintingindustry.com/news/delta-3d-printers-get-three-heads-with-watercooling-65097/, (published on Jan. 19, 2016), 3D-Printing Industry.

Mastory, "Compressed Air Cooling As Alternative To Fans", https://ultimaker.com/en/community/4536-compressed-air-cooling-as-alternative-to-fans, (Published on Nov. 26, 2013), Ultimaker Community of 3D Printing Experts.

Jeremie Francois, "Cooling 3D Prints With An Aquarium Pump", Blog, http://www.tridimake.com/2016/05/3d-printing-cooling-with-air-pump-aquarium.html, (Published on May 18, 2016).

Michelle Matisons, "Try The "Overkill Cooling" Method For High-Quality Small 3D Printed Parts", https://3dprint.com/119203/overkill-cooling-method/, (Published on Feb. 10, 2016), 3DR Holdings.

Greatmagnet, "Compressed Air Cooling?", http://3dprintboard.com/showthread.php?8973-Compressed-air-cooling, (Published on Dec. 5, 2014), 3DR Holdings.

Fargo 3D Printing, "Heat Creep: What It Is And How To Prevent It", https://www.fargo3dprinting.com/how-to/heat-creep/, (Accessed on May 3, 2018), Fargo 3D Printing.

Kelvarnson, "PLA Heat Creep—Solved", Forum, https://forum.lulzbot.com/viewtopic.php?t=4200, (Published on Apr. 1, 2016), Lulzbot.

FDM_Process, "Duplicator i3 Serious Heat Creep Issues", Forum, https://www.reddit.com/r/3Dprinting/comments/3m9xkl/duplicator_i3_serious_heat_creep_issues/, (Published on Sep. 25, 2015), Reddit.

* cited by examiner

CARRIAGELESS PRINT HEAD ASSEMBLY FOR EXTRUSION-BASED ADDITIVE CONSTRUCTION

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

CLAIM OF PRIORITY

This application does not claim priority to any patent or patent application.

FIELD OF THE EMBODIMENTS

The present disclosure relates generally to a carriageless print head for use in extrusion-based additive construction. More particularly, the present disclosure relates to a carriageless print head which can be optionally configured to have cold end temperature monitoring, liquid cooling of the print head, and/or an air conduit for cooling the top layer of the final product as it is being printed.

BACKGROUND

In an extrusion-based additive construction ("EAC") 3D printer, a desired object is formed by melting a continuous solid material feed and selectively depositing the object layer-by-layer onto a flat surface. The defining factors in the quality and reliability of a 3D printer are the engineering and build quality of a 3D printer's material feeding, melting, and layer deposition mechanics.

EAC 3D printer material feeding, melting, and layer deposition mechanics can be broken down into two main components: the extruder; and the print head. The extruder is responsible for the motion of the continuous solid material feed, therefore controlling the amount and rate of which the material feed is deposited onto the flat surface, often called a "build platform." The print head is responsible for accepting the material feed pushed into it by the extruder, and subsequently melting it to be deposited onto a flat build surface. For this reason, the print head is the only component of the material feeding, melting, and layer deposition mechanics that must be in motion relative to the EAC 3D printer in order to form the desired object.

Despite this truth, many existing EAC 3D printers mount the extruder directly above the print head, resulting in the entire assembly moving during the EAC. While this has some limited benefit when a printed object is required to be flexible, it has a massive detriment of meaningfully limiting the speed with which the extruder/print head combination can create objects. Additionally, this bulky and heavy combination reduces the size efficiency of the printer, which is defined as the ratio of maximum printed-object size to the size of the printer's chassis.

The fundamental principles behind the extruder and the print head have not changed much since their inception. The print head can be broken down into two halves that work in tandem to create the ideal environment for EAC: a "hot end" and a "cold end." Specifically, those components create an optimized structure for feeding a continuous solid material feed into a melt zone, so that the melted material feed can be subsequently deposited onto a surface.

The hot end provides the "melt zone" and typically consists of a nozzle, a metal block, a heater cartridge, a temperature sensor, and a heat break. That is, the hot end provides the heat necessary to melt the material feed such that it may be used in EAC. The temperature sensor is typically either a thermistor or thermocouple. The heat break serves as a connection point from the hot end to the cold end and also provides for a heat transfer choke point due to its particular mechanical shape.

The purpose of the cold end is to maintain the rigidity of the material feed. Since the material feed is being pushed into the hot end, its rigidity must be maintained else one risks a failure to move it into the hot end due to an inability to "push-on-a-rope." The hot end and cold end may be collectively referred to as a "print head" though typically the print head for an EAC 3D printer contains several additional components to aid in the printing process though they are not essential. Firstly, the print head is typically fastened to a carriage that contains linear bearings (typically ball bearings) in order to achieve linear motion. The carriage also typically contains mount points for timing belts such that motion can be achieved by off-board motors.

Additionally, the print head may also include an additional fan and fan duct to facilitate the cooling of the top-most layer of the object being constructed. This is beneficial because plastic that has not yet cooled provides a poor foundation for subsequent layers of the print. Without proper top layer cooling, an EAC 3D printer can only print at a finite speed, well below the capabilities of the other components. Additionally, cooling the newly-extruded plastic also increases the 'bridging' performance of the printer. This means that with additional cooling of newly-extruded plastic, features with steep overhangs or unsupported spans of plastic may be better achieved.

In the vast majority of existing EAC 3D printers, the cold end of the print head is air-cooled by radiating heat absorbed into the surrounding environment, typically via active cooling with fans and heatsinks and only in extreme cost-cutting edge cases, passive radiation. In the construction of an air-cooled embodiment, there is typically one heatsink, one pair of standoffs, one axial fan, and one fan blade guard per hot end of the EAC 3D printer. Therefore, for most EAC 3D printers with two hot ends, there are two heatsinks, two pairs of standoffs, two axial fans, and two fan blade guards, in addition to the bolts to fasten the assembly. This large bill of materials for just the cooling subcomponent of the EAC 3D print head is expensive to construct and is an inefficient use of space.

While the weight and bill of materials (BoM) savings of a passively-cooled EAC 3D print head is tempting, print heads typically include some sort of cooling method to keep the cold end cool for a fundamental reason. Over enough time, the cold end will begin to absorb heat from the hot end due to heat diffusion. This can lead to catastrophic failures of the EAC 3D printer as this heat creep could cause a jam by heating the material feed to its Glass Transition Temperature (Tg), (the temperature region where the polymer transitions from a hard, glassy material to a soft, rubbery material) thus causing a "pushing-on-a-rope" situation and a subsequent jam.

There have been several attempts in the prior art to improve certain components of an EAC 3D printer print head. However, these components lack novel features disclosed herein and have yet to be proposed in the unique combination disclosed herein, which yields unexpectedly positive results in both weight reduction, size footprint reduction, and reliability while simultaneously achieving all goals already achieved by incumbent design.

The pursuit to reduce EAC 3D printer print head weight is beneficial as currently it serves as a bottleneck in the EAC process common to all types of EAC 3D printers. Put simply, even minor reductions to the weight of the print head yield meaningful improvements in the speed of EAC, so major reductions in weight will result in substantial improvement over the prior art. This is because of the first law of Newtonian physics that governs inertia: an EAC 3D printer print head in motion will take significant force to accelerate or decelerate accurately. Because of this, in order to achieve accurate parts EAC 3D printers are programmed to print slower than their theoretical limit. Additionally, the forces from acceleration and deceleration are absorbed by the printer's chassis, linear shafts, and belts, which cause vibrations. These vibrations show in completed objects and present themselves as surface artifacts in the print. Such surface features make EAC 3D printing undesirable for cosmetic or end-use parts, but this can be solved through superior print head design.

As such, there is a need for a print head that is capable of incorporating all of the desired optional features currently employed in the art, but has a smaller footprint and weighs less than the print heads known in the art.

SUMMARY

An aspect of an example embodiment in the present disclosure is to provide a carriageless print head for use in EAC 3D printing. Accordingly, the present disclosure describes a carriageless print head assembly, for use in extrusion-based additive construction, having a cold end and a hot end. The cold end has a front end, a rear end, a left side, a right side, a top surface extending from the front end to the rear end and from the left side to the right side, and a bottom surface extending from the front end to the rear end and from the left side to the right side. The hot end is attached to the bottom surface of the cold end, and is preferably removably attached. Preferably, the left side has a first timing belt attachment slot adjacent to and aligned with a first receiver for receiving a first shaft, where the first timing belt attachment slot extends substantially from the front end to the rear end, and the first shaft extends substantially from the front end to the rear end. Also, preferably, the right side has a second timing belt attachment slot adjacent to and aligned with a second receiver, where the second timing belt attachment slot extends substantially from the front end to the rear end, and the second shaft extends substantially from the front end to the rear end. In some embodiments, glide pads are used to facilitate movement along the shafts. In some embodiments, the carriageless print head only interfaces with a single shaft and only has one pair of the first timing belt attachment slot/first receiver or the second timing belt attachment slot/second receiver; as opposed to the dual-paired variant discussed above. The top surface is equipped with a first slot which extends downwardly towards the bottom surface and which is configured to receive a material feed.

In some embodiments, the top surface also has a second slot which extends downwardly towards the bottom surface and is configured to receive a second material feed. In other embodiments, the carriageless print head is equipped with a first heat break and optionally a second heat break. The first heat break is proximate to the first slot, and the second heat break is proximate to the second slot, such that it may affect the heat transfer between the cold end and the hot end at the first and second slot, respectively.

In other embodiments, the cold end of the carriageless print head is equipped with an air conduit that extends downwardly from the top surface to the bottom surface. Preferably, the air conduit comprises a nipple that extends upwardly from the top surface, and air duct that extends from the top surface towards the bottom surface. The nipple and air duct are fluidly connected such that air, or some other fluid, may be passed through the nipple into the air duct. In a highly preferred embodiment, the air duct is equipped with a plurality of fins configured to optimize airflow from the nipple to the bottom surface. In some embodiments, the air conduit is removably attached to the cold end.

In another preferred embodiment, the top surface also features a third slot which extends downwardly towards the bottom surface and is configured to receive a cooling fluid, as well as a fourth slot which extends downwardly towards the bottom surface and is configured to expel a cooling fluid. Preferably, the cold end also includes a fluid channel which has a perimeter contained within the cold end. There exist many embodiments where the fluid channel intersects with and extends between the third slot and the fourth slot. In some embodiments, the fluid channel features an opening on either the left side or right side, and uses a fluid channel plug to seal fluid within the fluid channel. In a highly preferred embodiment, the perimeter of the fluid channel is bounded by the bottom surface, the top surface, the front end, the rear end, the first receiver, and the second receiver.

In some embodiments, the carriageless print head features a thermal monitor for monitoring the temperature, preferably the interior temperature, of the cold end as is experienced by the hot end heat break(s), which is located proximate to the cold end to achieve such monitoring. The thermal monitor may be a temperature sensor such as a thermistor or thermocouple.

The present disclosure also provides for a computer-mediated method of performing extrusion-based additive construction while monitoring the cold end, using a 3D printer equipped with the carriageless print head of claim 1, comprising the steps of first beginning an extrusion-based additive construction by the 3D printer; reading an operating temperature of the cold end interior, by the thermal monitor; assessing whether the operating temperature is above a predetermined temperature threshold; and pausing the construction thus allowing the cold end to cool. In some embodiments, after the printing has been paused, the computer then reassesses whether the operating temperature is above the predetermined temperature threshold. If so, the computer shall keep the printing paused and will continually reassess the cold end temperature. Optionally, the computer can assess the cold end temperature on predetermined intervals. Once the cold end is below the threshold temperature, printing will resume. In some embodiments, a human operator will manually resume printing after they determine that the cold end is sufficiently cold.

One benefit of the embodiments in the present disclosure is that EAC 3D printers are able to print larger objects for a given printer size while simultaneously operating at a faster speed with greater reliability. To achieve the goal of larger objects and faster speed, this method strategically either integrates or off-boards key features of an EAC print head in order to deliver similar or enhanced functionality in a reduced size and weight footprint.

First and foremost, through the use of engineered plastic polymer bearings and by integrating the retention for these bearings into the print head design, the need for a carriage with traditional bearings to achieve linear motion is eliminated. Second, by off-boarding the air source to cool the top layer of extruded plastic and optionally integrating the airflow duct into the print head itself, weight and size footprint of the print head is further reduced. In a preferred embodiment, cooling fluid passing through the print head absorbs heat, but its dissipation to the greater environment is handled by an off-board pump and optional radiator, reservoir, and fan mounted externally to the moving print head, thereby reducing its size footprint and inertial mass. Further, many embodiments employ press-fit quick-release fittings for the material feed tubes, as well as the cooling fluid inlets and outlets, as well as for connections to the nipple. Finally, many embodiments deploy an additional temperature sensor in the "cold end" portion of the print head to boost reliability. By monitoring the temperature of the "cold end" of the print head, the method of the present disclosure can pause printing to allow the print head cold end to cool down, thereby preventing damage or jams and their subsequent print failures from unmonitored heat absorption into the print head cold end. Optionally, the software may automatically resume a print once sufficient cooling has occurred, resulting in jam protection without human intervention.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

Figure 1A:
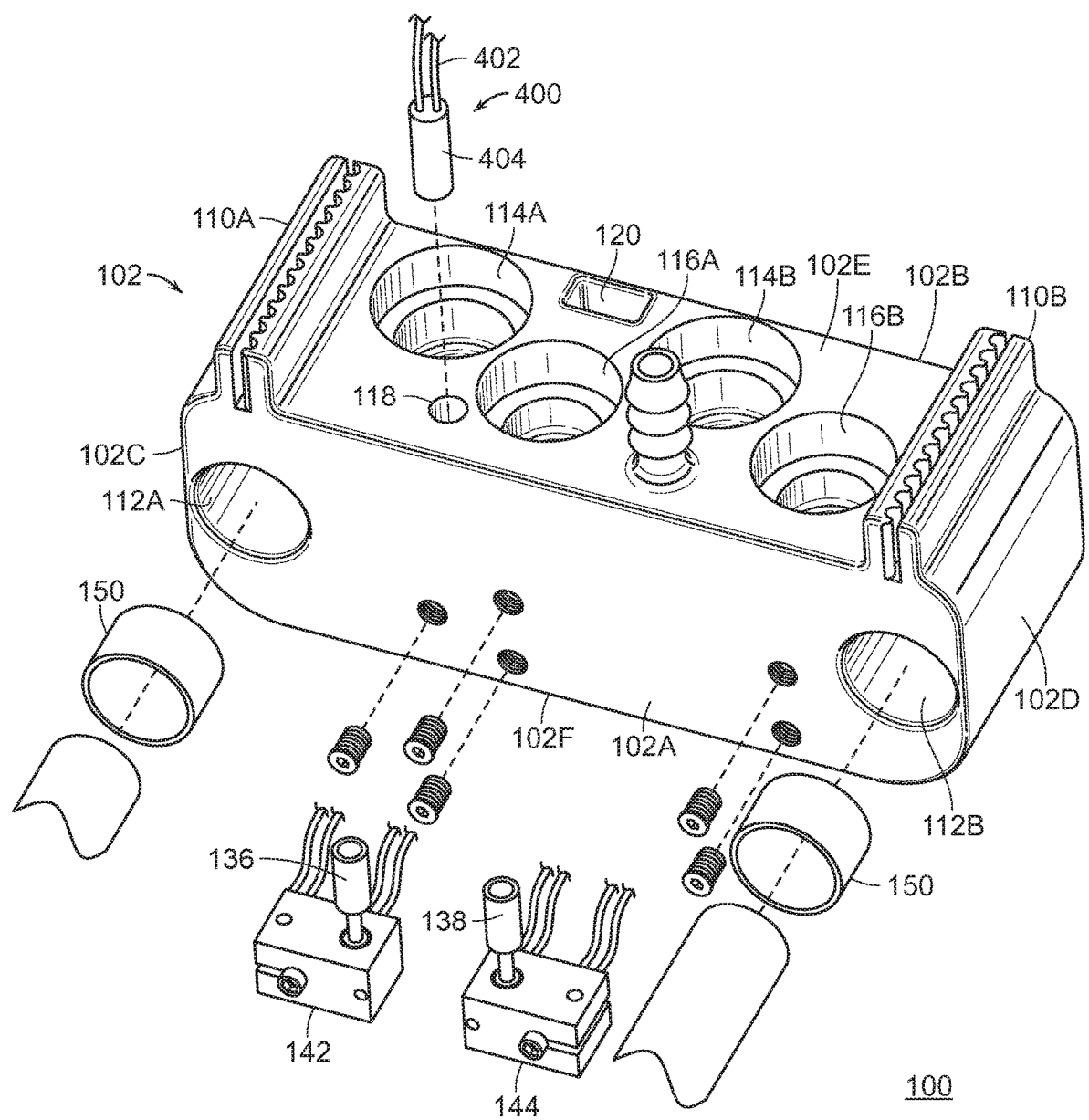
FIGS. 1A-1B show two embodiments of a carriageless EAC 3D printer print head design with two differing linear motion shaft systems.
Figure 1B:
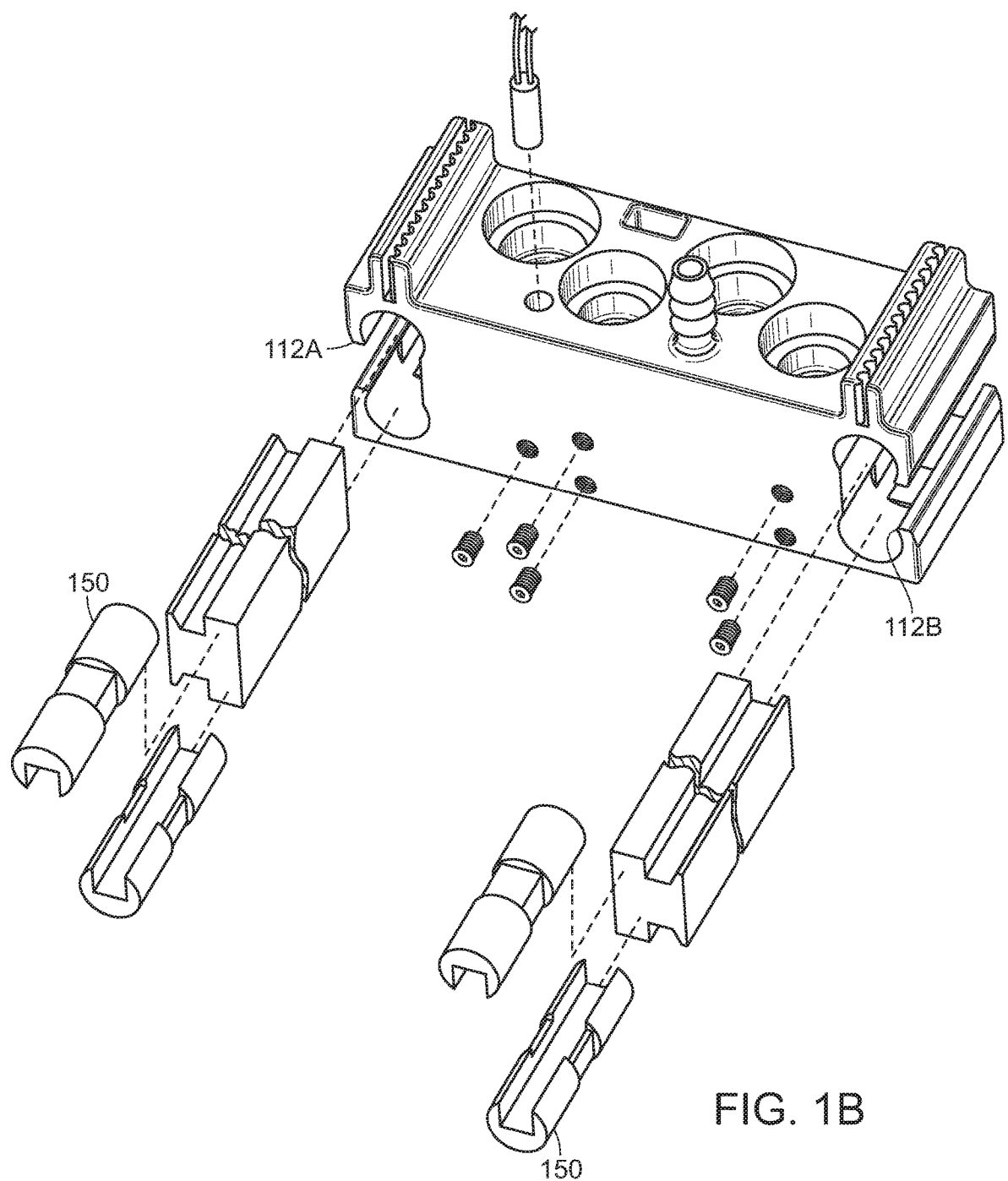

FIGS. 1A and 1B illustrate two embodiments of a carriageless print head in accordance with the present disclosure. Referring to FIG. 1A, a carriageless print head 100 is provided. The carriageless print head 100 is comprised of a cold end 102. The cold end 102 has a front end 102A, a rear end 102B, a left side 102C, a right side 102D, a top surface 102E, and a bottom surface 102F. The top surface 102E constitutes the top surface of the cold end 102, and the bottom surface 102F constitutes the bottom surface of the cold end 102, where both the top surface 102E and the bottom surface 102F extend from the first side 102C to the right side 102I), and from the front end 102A to the rear end 102B. The carriageless print head 100 is also equipped with a first heat break 136 attached to a first hot end 142 and a second heat break 138 attached to a second hot end 144. The first hot end 142 and the second hot end 144 are proximate to the first slot and the second slot, respectively.

Here, the top surface 102E is equipped with a first slot 116A and a second slot 116B. Both the first slot 116A and the second slot 116B are configured to receive a material feed to be used in the EAC process. Preferably, the first slot 116A and the second slot 116B are press-fit quick release plungers, although other types of attachment mechanisms are suitable. Optionally, the top surface 102E is equipped with a cable passthrough 120, which extends downwardly towards and through the bottom surface 102F, such that a cable may be threaded through the cold end 102. In some preferred embodiments, the top surface 102E features a bore for thermal monitor 118 meant to receive a thermal monitor 400. The thermal monitor 400 consists of at least one wire 402 and a temperature sensor 404. The temperature sensor 404 may be a thermocouple, thermistor, or any other type of electronic temperature-sensing device that may be interpreted by a microcontroller or similar computing device.

Preferably, the left side 102C and the right side 102D are substantially symmetrical. The left side 102C is equipped with a first receiver 112A and a first timing belt attachment slot 110A, and the right side 102D is equipped with a second receiver 112B and a second timing belt attachment slot 110B. By incorporating the first receiver 112A and the second receiver 112B into the cold end 102, a good deal of space, weight, and mechanical complexity is avoided when compared with solutions that exist in the prior art. Specifically, the first receiver 112A and second receiver 112B replace traditional ball bearings which provides for, greater design freedom. In some embodiments, the second receiver 112B is not present and only a single shaft is required to operate the carriageless print head 100. Thanks to this arrangement, bearings now take very little space outside of the size of the linear shafts they slide against, allowing their placement to be within the cold end 102. Optionally, one or more glide pads 150 may be employed to help the first receiver 112A and the second receiver 112B slide along a given shaft. Due to the proximate nature of the first receiver 112A and the first timing belt attachment slot 110A, as well as the proximity between the second receiver 112B and the second timing belt attachment slot 112A allows the carriageless print head 100 to be propelled along one or more linear shafts inserted in the first receiver 112A and/or the second receiver 112B. Preferably, the first timing belt attachment slot 110A and the second timing belt attachment slot 110B will be placed along the centerline of the first receiver 112A and the second receiver 112B, respectively. This has the benefit of minimizing torque during high acceleration of the carriageless print head 100. By using cylindrical shafts, the overall cost of the 3D printer may be reduced via the reduced cost of procuring the commonly used cylindrical shaft.

As shown in FIG. 1B, the first receiver 112A and the second receiver 112B may be shaped to work with non-cylindrical shafts. As a non-limiting example, the embodiment shown in FIG. 1B shows the first receiver 112A and the second receiver 112B in a configuration to use a T-shaped shaft. Here the optional glide pads 150 are shaped to interface with the T-shaped shaft as well as the first receiver 112A and the second receiver 112B. T-shaped shafts are desirable because they offer a balance between weight savings and maximum unsupported span. For large-format EAC 3D printers, the length of the linear shafts to span their large build platforms poses an engineering problem: larger-diameter shafts add weight to a system in motion, but smaller-diameter shafts cannot support the weight of an EAC print head without significant deflection-hindering the ability to print at very small layer heights and introducing potential for resonant frequencies that impact print quality. Accordingly, the embodiment of FIG. 1B could be deployed in a large-scale EAC 3D printer and exhibit significant weight savings, therefore achieving the goal of faster print speeds and better printed-part-to-printer-size ratio, with the unexpected outcome of reduced mechanical complexity in assembly of the EAC 3D printer print head prior to installation in the EAC 3D printer. Many other cross-sectional shapes of linear shafts are compatible with the first receiver 112A and the second receiver 112B, the first receiver 112A and the second receiver 112B just need to be shaped complimentarily to the desired shaft. In some embodiments, one or more glide pads 150 are inserted at the interface of the first receiver 112A and the first shaft, as well as the interface between the second receiver 112B and the second shaft. Again, in some embodiments only the first receiver 112A is present and the carriageless print head 100 operates using a single shaft.

Figure 2:
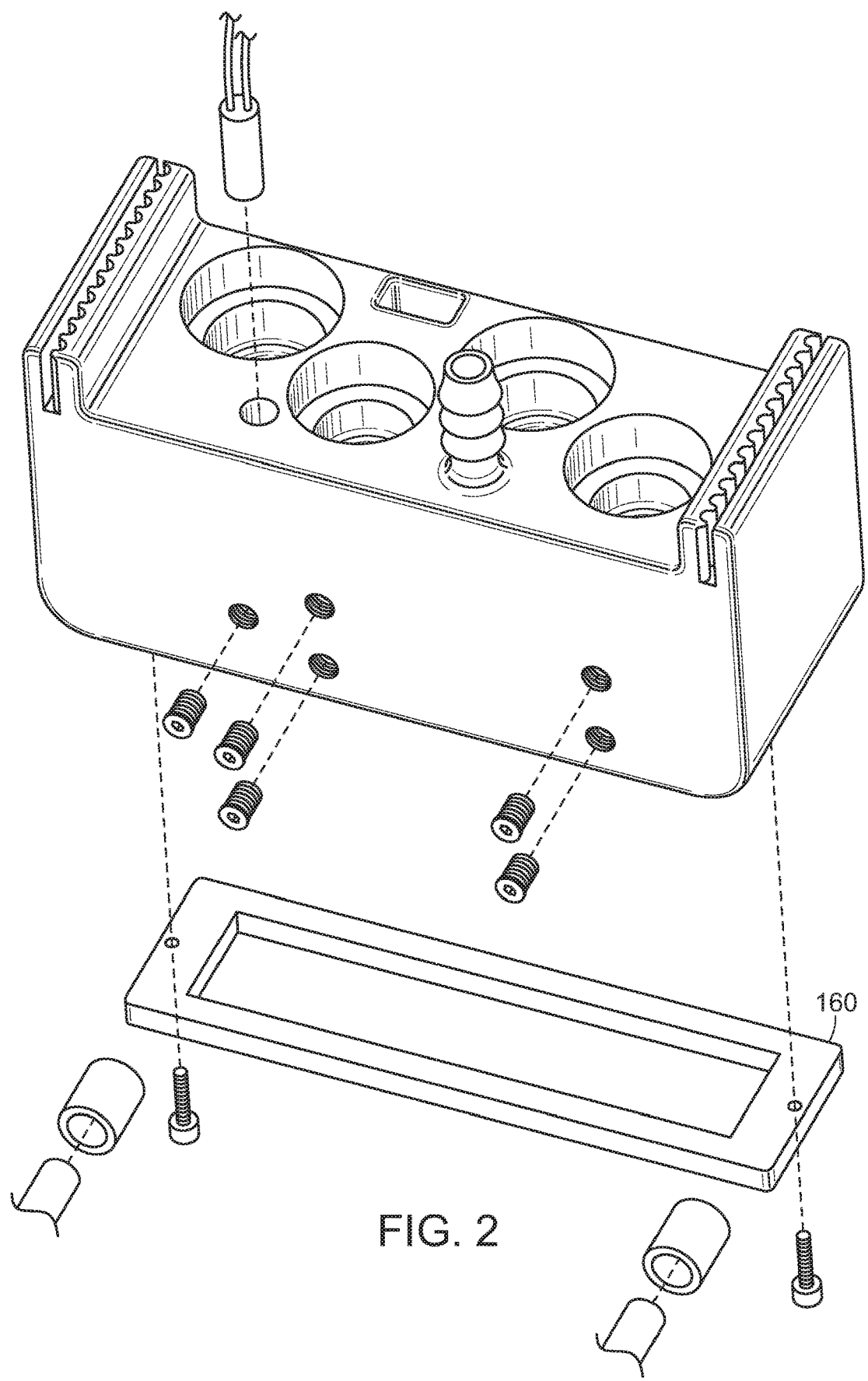
FIG. 2 shows an alternative embodiment of an EAC 3D printer print head design whereby linear motion is achieved through a traditional bolt-on carriage.

Referring to FIG. 2, an embodiment of the print head 100 is shown without the first receiver 112A or the second receiver 112B, and is instead depicted with a traditional carriage 160. As can be seen, the use of a separate carriage 160 to achieve linear motion requires additional mechanical complexity in assembly of the final product. In this embodiment, the use of the carriage 160 prevents meaningful weight savings, and size savings, offered by the embodiments shown in FIGS. 1A and 1B.

Figure 3A:
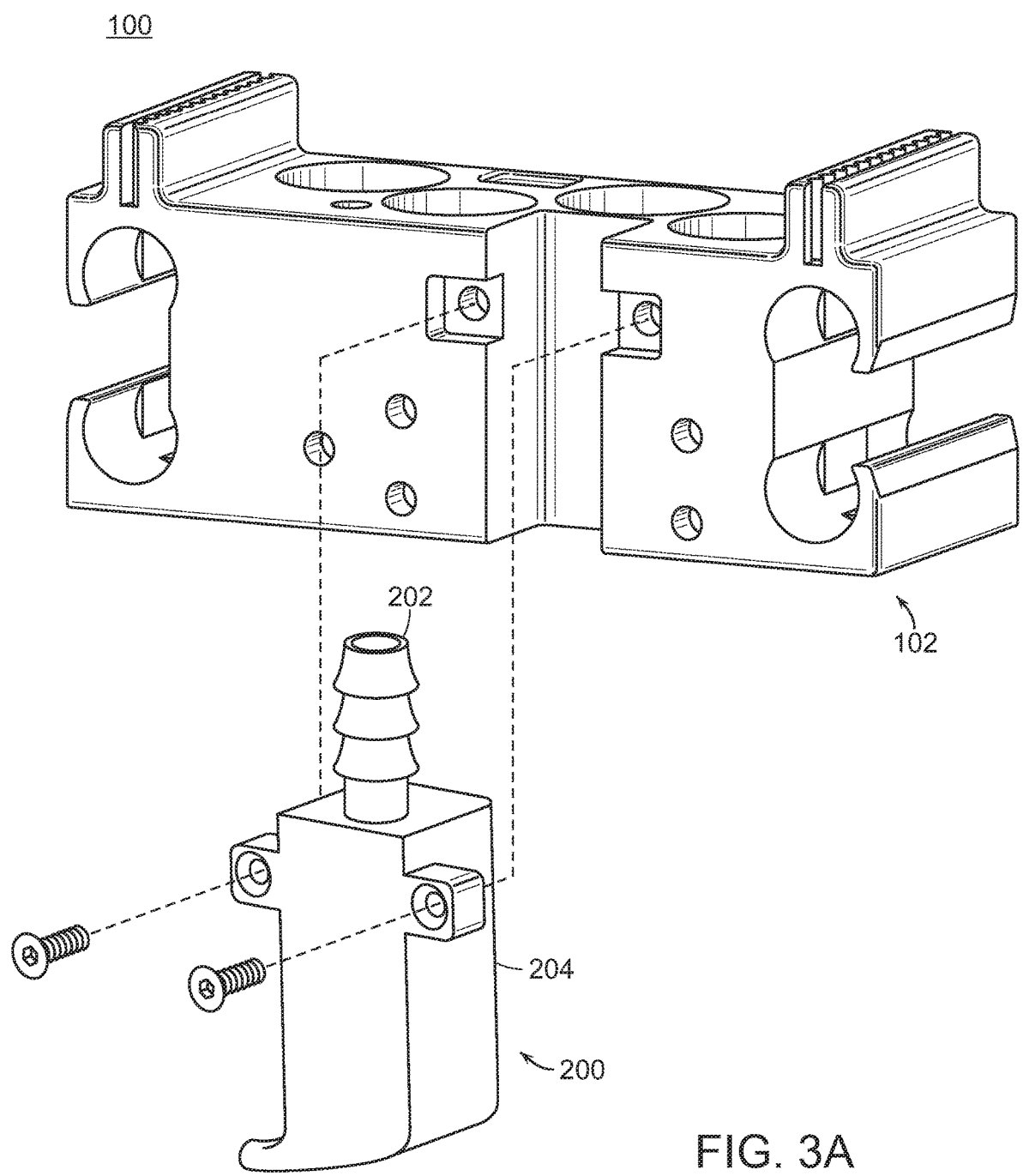
FIGS. 3A-3C show various implementations of a top layer cooling feature with the source of air off-board with respect to the print head.
Figure 3B:
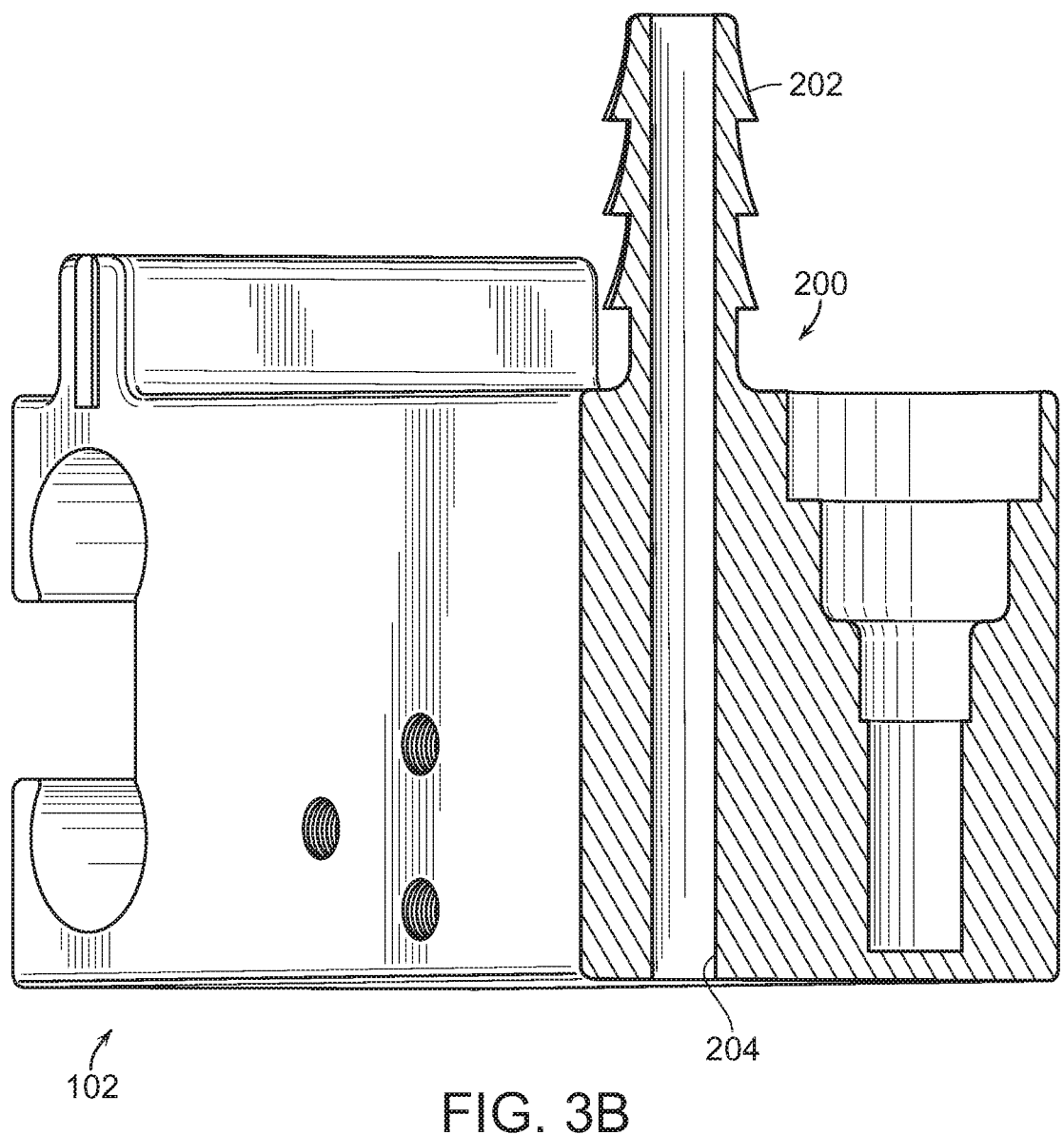
Figure 3C:
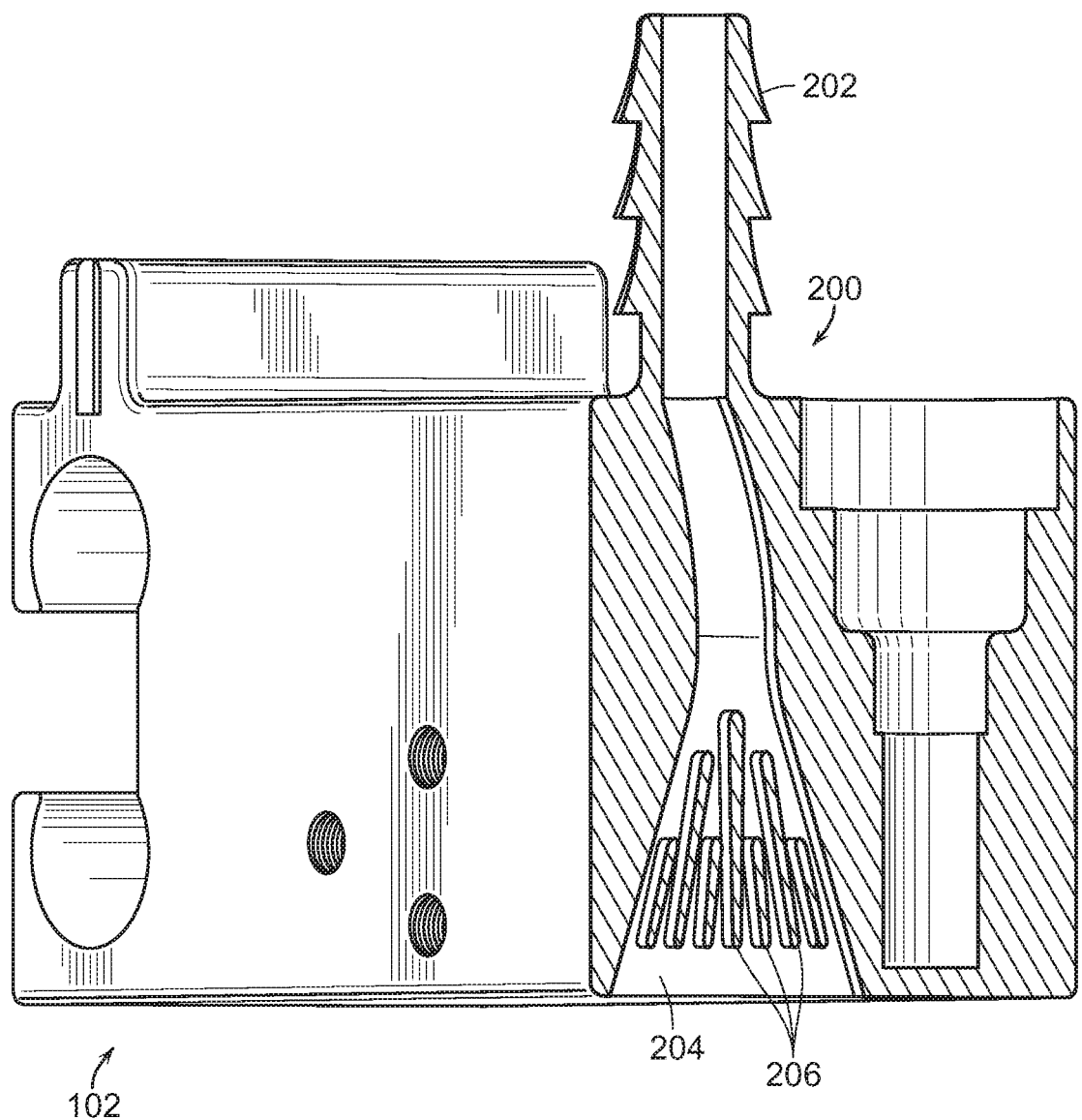

FIGS. 3A-3C show various embodiments of an air conduit 200 in accordance with the present disclosure. In FIG. 3A, the air conduit 200 consists of a nipple 202, and an air duct 204. In this embodiment, the air duct 204 is removably attached to the cold end 102. The nipple 202 allows the source of the air to be located somewhere not on the cold end 102, allowing for meaningful size and weight reduction of the carriageless print head 100.

Typically, in devices known in the prior art, air sources employed in EAC 3D printing use an air source that is mounted on the given print head in motion. These air sources may be either radial fans or axial fans, and may also have an air duct to direct airflow downwards towards newly-extruded plastic in order to avoid cooling the hot end. These designs all bear the flaw of having the moving mass of the air source and any optional duct on the print head, which increases its size, reduces its speed due to its mass, and potentially has an impact on print quality due to resonant frequencies due to inertial mass.

In contrast, the embodiments shown in FIGS. 3A-3C employ various off-board air sources for cooling the top layer of a printed object. The nipple 202 preferably connects to an off-board air source via a barbed-tube fitting, but could employ a compression fitting, push-to-connect tube fitting, or other known mechanical fastening agents for tubes that supply pressurized airflow. The external air source may be an air compressor, compressed air (or other pressurized gas) tank, chemical reaction, motorized bellows, or even a fan capable of driving sufficient pressure through a small-diameter tube.

Referring to FIG. 3B, the air conduit 200 is shown in an integrated embodiment. That is, the air conduit 200 has been integrated into the cold end 102. This achieves the goal of having an off-board air source provide cooling air to the top layer. FIG. 3C shows a highly preferred embodiment where the air conduit 200 is integrated with the cold end 102, but is also equipped with a plurality of embedded fins 206 and the air duct 204 is optimized to facilitate airflow therethrough. The plurality of embedded fins 206 create a uniform-velocity flow at the exit orifice, effectively creating a 'blade of air' to cool the top layer of the printed part. This provides optimal performance to prevent over or under-cooling localities of the printed part. The embodiment of the air conduit 200 shown in FIG. 3C is also optimal in its placement of the air duct 204: by situating the air conduit 200 between the first slot 116A and the second slot 116B, the air duct 204 cools newly-extruded filament material just as effectively regardless of whether the first slot 116A or the second slot 116B is extruding the material feed.

Figure 4A:
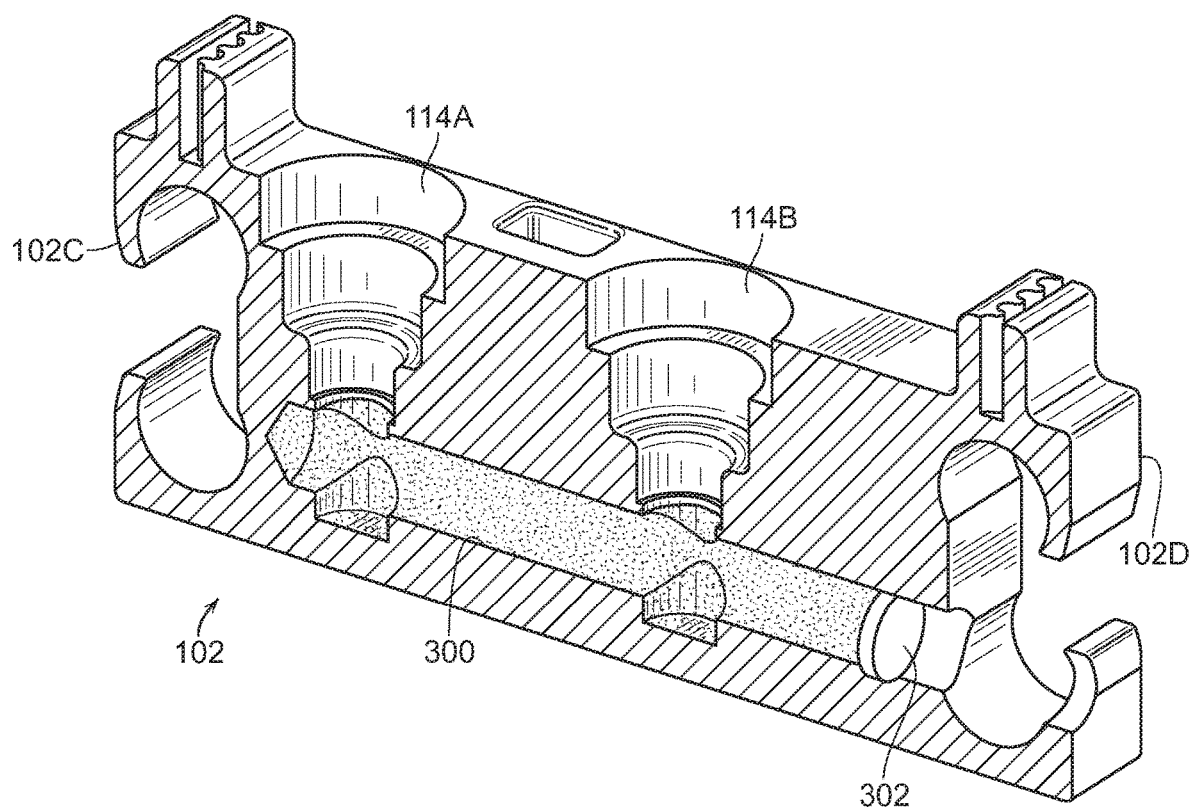
FIGS. 4A-4C show various implementations of a cold end cooling feature with the components to dissipate heat to the outside environment off-board with respect to the print head.
Figure 4B:
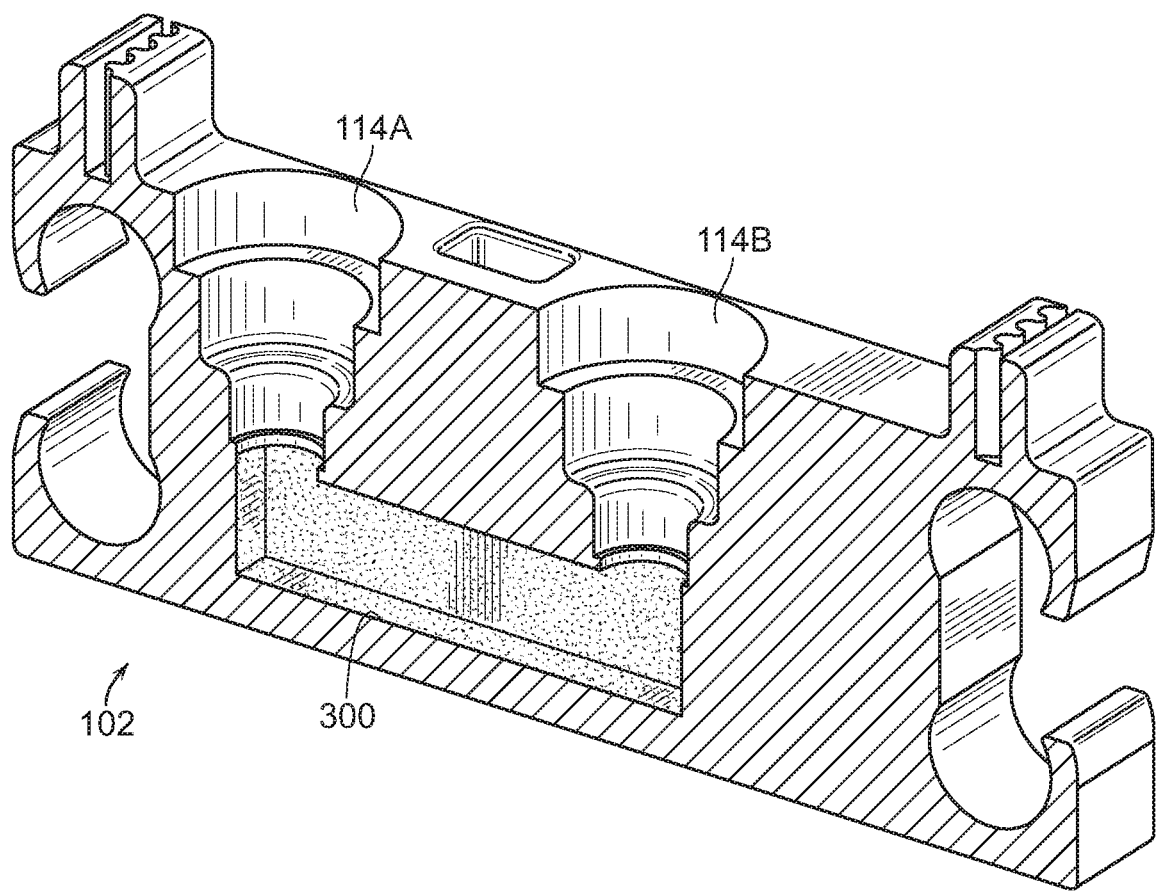
Figure 4C:
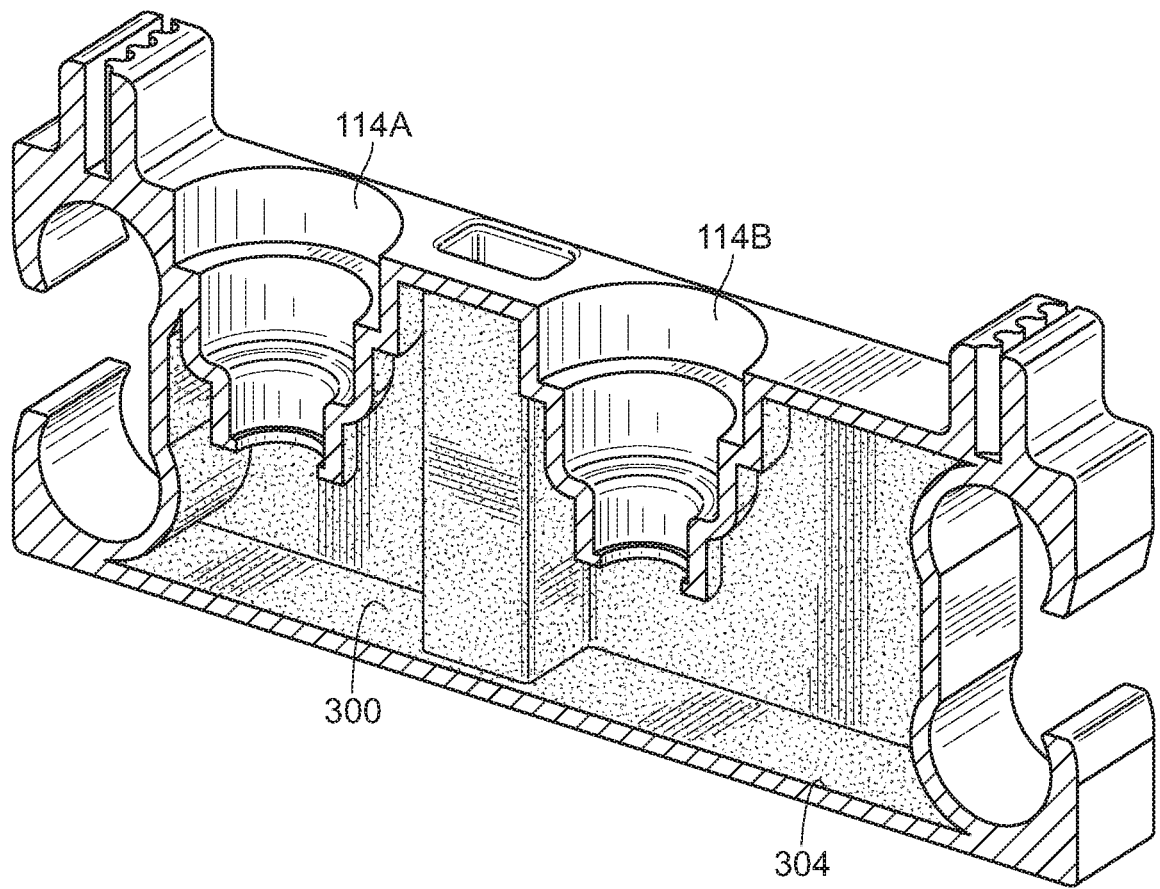

Referring to FIGS. 4A-4C, three embodiments of a water channel 300 or a cooling fluid channel 300 are shown. In these embodiments, the cold end 102 is cooled by liquid cooling. FIG. 4A shows the water channel 300 is drilled from either the left side 102C or the right side 102D and subsequently plugged with cooling fluid channel plug 302 to form a seal. Such a seal may take many forms, such as a set screw, a set screw with thread lock, other screw-type plugs, and deformable metal cooling circuit plugs. Cooling fluid, preferably water, is circulated through the third slot 114A and the fourth slot 114B, which are configured to allow fluid to selectively pass through them.

FIG. 4B shows an embodiment where the cooling fluid channel 300 is completely contained within the cold end 102. This embodiment provides benefits over the one shown in FIG. 4A because there is no post-manufacture assembly required to seal the cooling fluid channel, correspondingly no failure point for the cooling fluid channel's seal, and lastly offers the greatest amount of design freedom.

Shown in FIG. 4C is a highly preferred embodiment in accordance with the present disclosure. This embodiment depicts a cooling fluid channel 300 with a perimeter 304 where the connection between the third slot 114A and the fourth slot 114B is not a simple channel, but rather where the perimeter 304 constitutes a completely customized internal envelope within the cold end 102. In FIG. 4C we see that there is not only a channel to connect the fluid inputs and fluid outputs, but this channel is expanded to envelop other features internal to the carriageless print head 100. By doing this, one no longer has to rely on the thermal conductivity of the cold end 102.

In some embodiments, the carriageless print head 100 is integrated with an embedded thermal monitor 400. In some embodiments, the carriageless print head 100 is integrated with multiple thermal monitors 400. By embedding the temperature sensor 404 in the top surface 102E, one now has a dedicated thermal monitor 400 that can trigger protective action to prevent a jam or other damage to the carriageless print head 100 typically caused by long print jobs or times of peak printer usage with little rest between jobs.

It is important to note that the presence of the thermal monitor 400 alone is insufficient to prevent jams or damage caused by heat creep into the cold end. For preventative/protective action to be taken, accompanying software must be able to interpret the data provided by the temperature sensor and trigger action accordingly. Two proposed workflows for this process are shown in FIGS. 5A and 5B.

"Cold Pause Mode" is defined as a mode in which an EAC 3D printer pauses printing and disables the heaters in the hot end. This allows the printer to cool safely and subsequently resume printing without any damage or risk of completion to the printed object. The process shown in FIG. 5A, is optimal for having printers print continuously, pausing only to prevent heat-related jamming or damage. The process shown in FIG. 5B takes a more conservative approach in that upon detection of too much heat being absorbed into the cold end, the printer is put indefinitely into Cold Pause Mode until a human operator can diagnose the problem and manually re-engage the printer to complete the print or to cancel the print job entirely. The workflows disclosed in FIGS. 5A and 5B may optionally have an alerting system to notify administrators of the printers of the detected elevated temperatures in the cold end 102. It is also notable that while this logic may be embedded into the printer's main firmware logic, it may also be present on an external logic board. An external logic board would be beneficial when the logic needs to be parsed by such an independent microcontroller and only a stop/pause/cold pause signal can be sent and accepted by the EAC 3D printer's primary controller board.

Figure 5A:
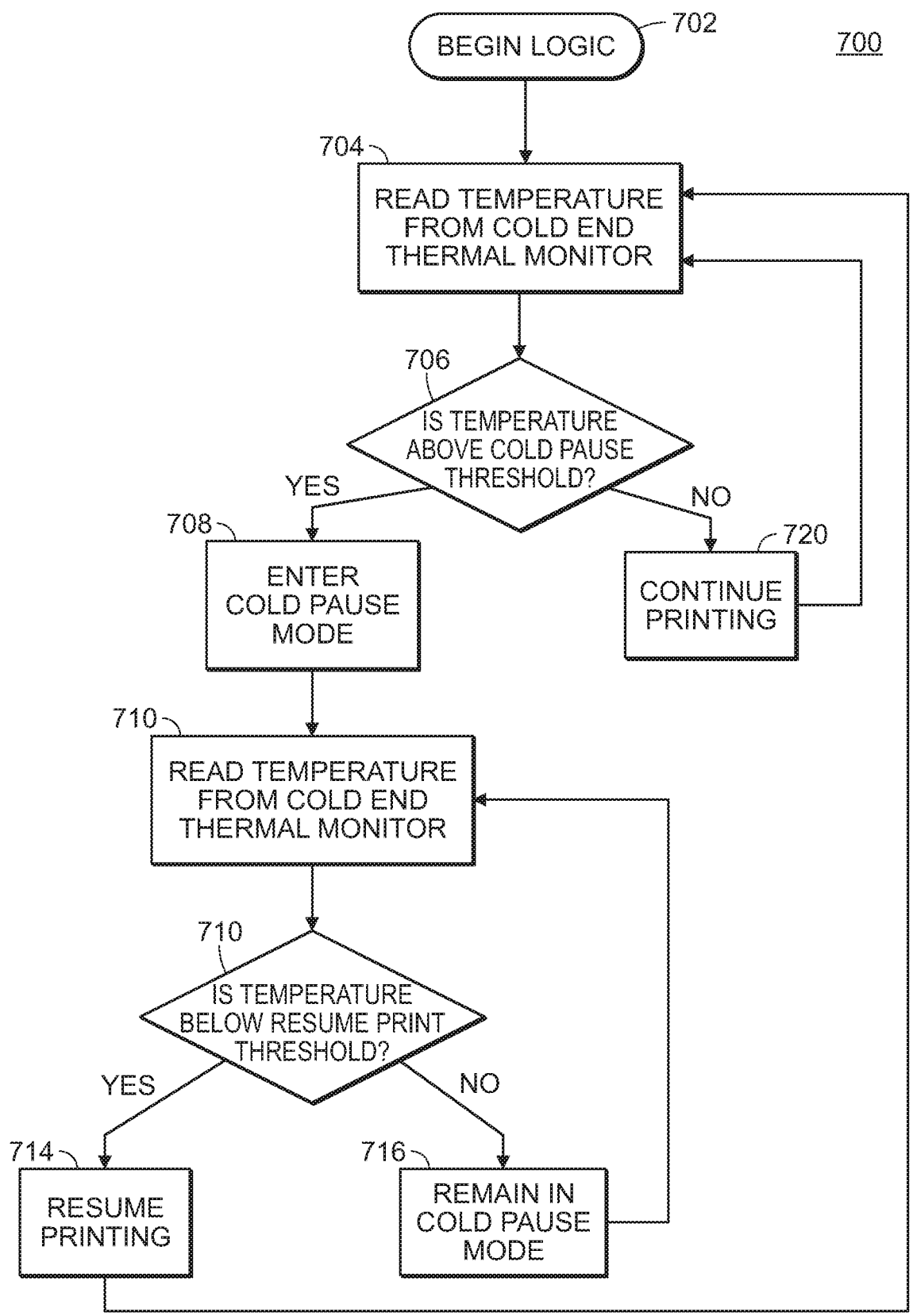
FIGS. 5A-5B show flow charts illustrating the logic of an embodiment of the method of cold end thermal monitoring in accordance with the present disclosure.
Figure 5B:
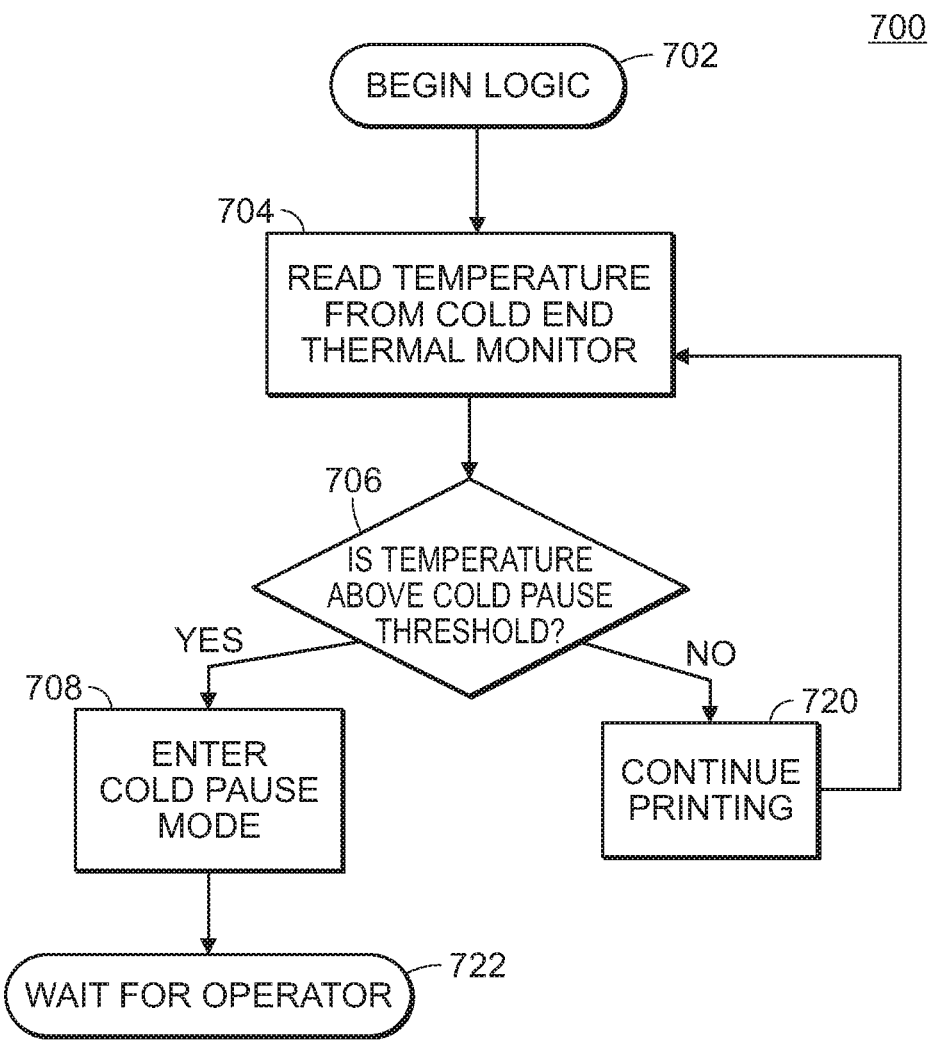

Referring to FIG. 5A, a method of monitoring the temperature of a cold end of an EAC 3D printer 700 is shown. Here, the method 700 begins with step 702, and proceeds to step 704 where the temperature of a thermal monitor configured to measure the temperature of the cold is read. Then the method 700 proceeds to step 706 where the method 700 assesses whether the read temperature is above a cold pause threshold. If the read temperature is below the cold pause threshold, the method proceeds to step 720 where the EAC 3D printer is allowed to continue printing. However, if the read temperature is above the cold pause threshold, the method proceeds to step 708, where the EAC 3D printer enters a cold pause mode, where the print job is stopped. From there, the method 700 proceeds to step 710 where the temperature of the thermal monitor is reassessed, and in step 712 the method 700 determines if the read temperature is still above the cold pause threshold. If so, the method proceeds to step 716 where printing is paused, and repeats step 710 again. If not, the method proceeds to step 714 where the EAC 3D printer is allowed to resume printing.

In FIG. 5A, there are two threshold variables that need to be known: the Cold Pause Threshold and the Resume Print Threshold. The Cold Pause Threshold variable is dependent on the material being printed, specifically the material's Glass Transition Temperature (Tg). In some embodiments the Cold Pause Threshold would be equivalent to the material's Glass Transition Temperature (Tg), though in other, preferred embodiments, the Cold Pause Threshold should include some buffer to protect against imperfections in the sensor, or other real-world environmental variables. As an example, when printing in Acrylonitrile Butadiene Styrene (ABS) plastic, whose Glass Transition Temperature (Tg) is ~105 degrees Celsius, an appropriate Cold Pause Threshold could be 100 degrees Celsius, giving 5 degrees "buffer". To resume printing, there would also be a Resume Print Threshold.

In many embodiments, it is to cool below the Resume Print Threshold to prevent excessive pausing and re-starting. Therefore, the Resume Print Threshold would be set to an arbitrary amount below the Cold Pause Threshold. In the example of Acrylonitrile Butadiene Styrene (ABS) plastic with a ~105 degrees Celsius Glass Transition Temperature (Tg) and a 100 degrees Celsius Cold Pause Threshold, a Resume Print Threshold could be 95 degrees Celsius.

In other embodiments, it may be preferential to the operator that a printer remain paused until a human technician can diagnose the cause of the overheating. This use case is illustrated in the logic outlined in FIG. 5B. Here, the method 700 begins with step 702, and proceeds to step 704 where the temperature of a thermal monitor configured to measure the temperature of the cold end 102 is read. Then the method 700 proceeds to step 706 where the method 700 assesses whether the read temperature is above a cold pause threshold. If the read temperature is above the cold pause threshold, the method 700 proceeds to step 708 where the EAC 3D printer enters a cold pause mode, and then proceeds to step 722 where a human operator must manually resume printing. If the read temperature is below the cold pause threshold, the method 700 will proceed to step 720 where the EAC 3D printer is allowed to keep printing. In FIG. 5B there is no need to set a separate Resume Print Threshold because upon detecting the EAC 3D printer's print head cold end temperature breaching the Cold Pause Threshold, the printer is put in an indefinite Cold Pause.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, "a first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Attention is called to the fact, however, that the drawings are illustrative only. Variations are contemplated as being part of the disclosure.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a carriageless print head. The disclosure is illustrated by example in the drawing figures, and throughout the written description. It should be understood that numerous variations are possible, while adhering to the inventive concept and spirit of the invention. Such variations are contemplated as being a part of the present disclosure.

What is claimed is:

1. A carriageless print head assembly, for use in extrusion-based additive construction, comprising:
   a cold end having a front end, a rear end, a left side, a right side, a top surface extending from the front end to the rear end and from the left side to the right side, and a bottom surface extending from the front end to the rear end and from the left side to the right side; and
   a hot end configured to provide a melt zone, the hot end being removably attached to the bottom surface,
      wherein the left side has a first timing belt attachment slot adjacent to and aligned with a first receiver for receiving a first shaft, the first timing belt attachment slot extending substantially from the front end to the rear end, the first shaft extending substantially from the front end to the rear end, wherein the top surface is equipped with a first slot which extends downwardly towards the bottom surface and is configured to receive a first material feed, wherein the cold end is of a singular construction, further comprising an air conduit extending downwardly from the top surface to the bottom surface, the air conduit having a nipple extending upwardly from the top surface, and an air duct extending downwardly from the nipple to the bottom surface, wherein the air duct and the nipple are fluidly connected.

2. The carriageless print head of claim 1, wherein the air duct is equipped with a plurality of fins configured to optimize airflow from the nipple to the bottom surface.

3. The carriageless print head of claim 1, wherein the air conduit is removably attached to the cold end.

4. A carriageless print head assembly, for use in extrusion-based additive construction, comprising:

a cold end having a front end, a rear end, a left side, a right side, a top surface extending from the front end to the rear end and from the left side to the right side, and a bottom surface extending from the front end to the rear end and from the left side to the right side; and a hot end configured to provide a melt zone, the hot end being removably attached to the bottom surface, wherein the left side has a first timing belt attachment slot adjacent to and aligned with a first receiver for receiving a first shaft, the first timing belt attachment slot extending substantially from the front end to the rear end, the first shaft extending substantially from the front end to the rear end, wherein the right side has a second timing belt attachment slot adjacent to and aligned with a second for receiving a second shaft, the second timing belt attachment slot extending substantially from the front end to the rear end, the second shaft extending substantially from the front end to the rear end, wherein the top surface is equipped with a first slot, a second slot, a third slot, and a fourth slot, the first slot extending downwardly towards the bottom surface and is configured to receive material feed, the second slot extending downwardly towards the bottom surface and is configured to receive material feed, the third slot extending downwardly towards the bottom surface and is configured to receive a cooling fluid, the fourth slot extending downwardly towards the bottom surface and is configured to expel a cooling fluid, wherein the carriageless print head is equipped with a first heat break, which is proximate to the first slot and a second heat break which is proximate to the second slot;

an air conduit extending downwardly from the top surface to the bottom surface, wherein the air conduit comprises a nipple extending upwardly from the top surface, and air duct extending downwardly from the nipple to the bottom surface, the air duct and the nipple being fluidly connected, wherein the air duct is equipped with a plurality of fins configured to optimize airflow from the nipple to the bottom surface;

a fluid channel having a perimeter, wherein the perimeter of the fluid channel is contained within the cold end and the perimeter is bounded by the bottom surface, the top surface, the front end, the rear end, the first receiver and the second receiver; and a thermal monitor having a temperature sensor, wherein the thermal monitor is located within the cold end such that the temperature of the cold end may be monitored by the thermal monitor.

* * * * *